US012756293B2

(12) United States Patent
Wakisaka et al.

(10) Patent No.: US 12,756,293 B2
(45) Date of Patent: Oct. 6, 2026

(54) POWER SUPPLY DEVICE INCLUDING A NOISE ATTENUATION UNIT

(71) Applicant: KABUSHIKI KAISHA TOYOTA JIDOSHOKKI, Aichi (JP)

(72) Inventors: Shinya Wakisaka, Aichi (JP); Yoshiaki Ishihara, Aichi (JP); Kenichi Nakata, Aichi (JP)

(73) Assignee: KABUSHIKI KAISHA TOYOTA JIDOSHOKKI, Aichi (JP)

( * ) Notice: Subject to any disclaimer, the term of this patent is extended or adjusted under 35 U.S.C. 154(b) by 189 days.

(21) Appl. No.: 18/723,608

(22) PCT Filed: Dec. 8, 2022

(86) PCT No.: PCT/JP2022/045278

§ 371 (c)(1),
(2) Date: Jun. 24, 2024

(87) PCT Pub. No.: WO2023/127445

PCT Pub. Date: Jul. 6, 2023

(65) Prior Publication Data

US 2025/0070646 A1 Feb. 27, 2025

(30) Foreign Application Priority Data

Dec. 28, 2021 (JP) ................................ 2021-214688

(51) Int. Cl.
*H02M 1/44* (2007.01)
*H02M 1/12* (2006.01)

(52) U.S. Cl.
CPC .............. *H02M 1/12* (2013.01); *H02M 1/44* (2013.01)

(58) Field of Classification Search
CPC ........ H02M 7/003; H02M 7/487; H02M 1/12; H02M 1/44; H01F 27/00; H01F 37/00
See application file for complete search history.

(56) References Cited

U.S. PATENT DOCUMENTS 8,223,512 B2 * 7/2012 Yamada .............. H02M 1/4225 363/39
2004/0100347 A1 * 5/2004 Okamoto ............... H01F 1/344 336/83

(Continued)

FOREIGN PATENT DOCUMENTS

JP 2010-057268 A 3/2010
JP 2010-161900 A 7/2010

(Continued)

OTHER PUBLICATIONS

International Search Report issued in International Application No. PCT/JP2022/045278, dated Jan. 24, 2023, along with an English translation thereof.

(Continued)

*Primary Examiner* — Sisay G Tiku

(74) *Attorney, Agent, or Firm* — Greenblum & Bernstein, P.L.C.

(57) ABSTRACT

In this power supply device, a main circuit includes a core, a first common mode coil, a second common mode coil, a first connection line, and a second connection line, and a noise attenuation unit includes an auxiliary coil having a third winding and a third coating, a capacitor connected to the first connection line, and a resonance suppression unit that includes an amplification unit and a low-pass filter connected to an output terminal of the amplification unit and that is provided between the auxiliary coil and the capacitor.

8 Claims, 5 Drawing Sheets

(56) References Cited

U.S. PATENT DOCUMENTS

| | | | | |
|---|---|---|---|---|
| 2012/0306609 | A1* | 12/2012 | Kato | H01F 17/0013 336/200 |
| 2014/0306788 | A1* | 10/2014 | Umetani | H01F 27/385 336/173 |
| 2016/0111204 | A1* | 4/2016 | Hashimoto | H01F 27/29 336/170 |
| 2019/0089243 | A1* | 3/2019 | Naito | H02M 1/126 |
| 2021/0012949 | A1* | 1/2021 | Miyamoto | H01F 27/29 |
| 2021/0090776 | A1* | 3/2021 | Fukasaku | F04C 29/0085 |
| 2021/0296044 | A1* | 9/2021 | Yamakita | H01F 27/29 |
| 2024/0087804 | A1* | 3/2024 | Zhang | H02M 1/0064 |

FOREIGN PATENT DOCUMENTS

| | | | |
|---|---|---|---|
| JP | 2011-239564 | A | 11/2011 |
| WO | WO2020/0171095 | A1 | 8/2020 |

OTHER PUBLICATIONS

Translation of International Preliminary Report on Patentability issued in International Application No. PCT/JP2022/045278, dated Jul. 11, 2024.

* cited by examiner

POWER SUPPLY DEVICE INCLUDING A NOISE ATTENUATION UNIT

TECHNICAL FIELD

The present invention relates to a power supply device.

BACKGROUND ART

Patent Literature 1 discloses a power supply device. The power supply device disclosed in Patent Literature 1 includes a three-phase inverter of a neutral point clamp type (NPC) capable of outputting three levels, which is connected to a DC power source having three potentials and drives a three-phase load, a unit that calculates a three-phase voltage command, a neutral point potential fluctuation suppressing unit that calculates a zero-phase bias voltage compensation amount to suppress a fluctuation in the neutral point potential in accordance with a three-phase voltage command and a current flowing in a load current, and a unit that corrects the zero-phase bias voltage compensation amount by adding it to the three-phase voltage command, and the neutral point potential fluctuation suppressing unit includes a unit that calculates the zero-phase bias voltage compensation amount in accordance with at least an absolute value and sign of the three-phase voltage command and the load current.

CITATION LIST

Patent Literature

[Patent Literature 1] Japanese Unexamined Patent Publication No. 2011-239564

SUMMARY OF INVENTION

Technical Problem

A power supply device that includes a noise attenuation unit that attenuates noise generated in electronic equipment (such as a switching unit) in a configuration that includes a common mode choke coil is known. The noise attenuation unit detects a common mode current, and amplifies a signal including the common mode current in an amplification unit to generate an attenuated current, thereby attenuating noise. In this configuration, a gain of a closed circuit including the noise attenuation unit (an output voltage at a predetermined point in the closed circuit including the noise attenuation unit/an input voltage at a predetermined point in the closed circuit) may be high at a resonance frequency, and oscillation may occur in the closed circuit including the noise attenuation unit. In this case, the noise attenuation unit does not operate normally, and therefore the noise cannot be attenuated.

An object of one aspect of the present invention is to provide a power supply device capable of suppressing oscillation in a closed circuit including a noise attenuation unit.

Solution to Problem

A power supply device according to one aspect of the present invention includes a main circuit, a switching unit connected to the main circuit, and a noise attenuation unit configured to attenuate noise generated in the switching unit, wherein the main circuit includes a core, a first common mode coil including a first winding and a first coating configured to coat the first winding and wound around the core, a second common mode coil including a second winding and a second coating configured to coat the second winding and wound around the core, a first connection line configured to connect the first winding and the switching unit, and a second connection line configured to connect the second winding and the switching unit, and the noise attenuation unit includes an auxiliary coil including a third winding and a third coating configured to coat the third winding and wound around the core such that the third winding is spaced apart from the first winding and the second winding by a predetermined insulation distance, a capacitor connected to at least one of the first connection line and the second connection line, and a resonance suppression unit including an amplification unit and a low-pass filter connected to the amplification unit and provided between the auxiliary coil and the capacitor.

In the power supply device according to one aspect of the present invention, the resonance suppression unit has a low-pass filter. Thus, in the power supply device, even when a signal is amplified in the amplification unit, it is possible to suppress occurrence of oscillation in a closed circuit including the noise attenuation unit. As a result, in the power supply device, noise generated in the switching unit can be attenuated.

In one embodiment, an input terminal of the amplification unit may be electrically connected to the third winding, and an output terminal of the amplification unit may be electrically connected to the capacitor. In this configuration, a common mode current is detected in the third winding, and a signal including the common mode current is amplified in the amplification unit to generate an attenuated current. This configuration also makes it possible to attenuate the noise generated in the switching unit.

In one embodiment, an input terminal of the amplification unit may be electrically connected to the capacitor, and an output terminal of the amplification unit may be electrically connected to the third winding. In this configuration, a common mode voltage is detected in the capacitor, and a signal including the common mode voltage is amplified in the amplification unit to generate an attenuated current. This configuration also makes it possible to attenuate noise generated in the switching unit.

In one embodiment, the capacitor may be connected to the first connection line, and the predetermined insulation distance may be a distance at which a gain of a closed circuit becomes 0 or less when a phase of an input and a phase of an output at a predetermined point of the closed circuit including a parasitic capacitance generated between the first winding and the third winding, the third winding, the resonance suppression unit, the capacitor, and the first connection line are in phase. In the case of a power supply device in which a closed circuit is formed by a parasitic capacitance, at a resonant frequency determined by the parasitic capacitance, the gain of the closed circuit (an output voltage at a predetermined point in the closed circuit/an input voltage at a predetermined point in the closed circuit) becomes high, and oscillation may occur in the closed circuit. In this configuration, the distance between the first winding and the third winding is set so that the gain of the closed circuit is 0 or less when the phase of the input and the phase of the output at a predetermined point in the closed circuit are in phase. Therefore, even when the gain of the closed circuit becomes high at the resonant frequency determined by the parasitic capacitance, it is possible to suppress the occurrence of oscillation in the closed circuit.

Further, for example, when the low-pass filter is made smaller, the cutoff frequency becomes higher, and it may become impossible to reduce the gain at the resonant frequency. Therefore, by adjusting the insulation distance to reduce the parasitic capacitance and to increase the resonant frequency, it is possible to suppress the occurrence of oscillation in the closed circuit even when the low-pass filter is made smaller.

In one embodiment, the auxiliary coil may be wound on the first common mode coil, and the predetermined insulation distance may be a sum of a thickness of the third coating and a thickness of the first coating. In this configuration, by winding the auxiliary coil around the first common mode coil and adjusting the thickness of the first coating and the thickness of the third coating, the distance between the first winding and the third winding can be easily set to the predetermined insulation distance.

In one embodiment, the thickness of the third coating may be thicker than the thickness of the first coating. In this configuration, the distance between the first winding and the third winding can be easily set to a predetermined insulation distance without impairing heat dissipation of the first winding through which a current larger than the third winding flows and which generates more heat than the third winding.

In one embodiment, the capacitor may be connected to the first connection line, the auxiliary coil may be wound around a portion of the core around which the first common mode coil and the second common mode coil are not wound, and the predetermined insulation distance may be a distance at which a gain of a closed circuit becomes 0 or less when a phase of an input and a phase of an output at a predetermined point of the closed circuit including a parasitic capacitance generated between the first winding and the third winding, the third winding, the resonance suppression unit, the capacitor, and the first connection line are in phase. In the case of a power supply device in which a closed circuit is formed by a parasitic capacitance, at a resonant frequency determined by the parasitic capacitance, the gain of the closed circuit (an output voltage at a predetermined point in the closed circuit/an input voltage at a predetermined point in the closed circuit) becomes high, and oscillation may occur in the closed circuit. In this configuration, the distance between the first winding and the third winding is set so that the gain of the closed circuit is 0 or less when the phase of the input and the phase of the output at a predetermined point in the closed circuit are in phase. Therefore, even when the gain of the closed circuit becomes high at the resonant frequency determined by the parasitic capacitance, it is possible to suppress the occurrence of oscillation in the closed circuit.

Further, for example, when the low-pass filter is made smaller, a cutoff frequency becomes higher, and it may be impossible to reduce the gain at the resonant frequency. Therefore, by adjusting the insulation distance to reduce the parasitic capacitance and to increase the resonant frequency, it is possible to suppress the occurrence of oscillation in the closed circuit even when the low-pass filter is made smaller.

In one embodiment, the capacitor may be connected to the first connection line, the main circuit may have a bobbin that accommodates the core, the first common mode coil and the second common mode coil may be wound around a first region in the bobbin, the auxiliary coil may be wound around a second region in the bobbin that is different from the first region, and the bobbin may have a protrusion portion provided between the first region and the second region such that the first winding and the third winding are spaced apart by the predetermined insulation distance. In this configuration, the protrusion portion can extend the insulation distance between the third winding and the first winding.

In one embodiment, the first winding, the second winding, and the third winding each may include a winding portion wound around the bobbin and have terminal portions that extend from both ends of the winding portion, the main circuit may have a substrate to which the terminal portion of the first winding, the terminal portion of the second winding, and the terminal portion of the third winding are connected, the bobbin may have a main body portion that accommodates the core and around which the winding portion of the first winding, the winding portion of the second winding, and the winding portion of the third winding are wound, and leg portions that extend from the main body portion toward the substrate and are mounted on the substrate, and the leg portions may be provided between the terminal portion of the first winding and the terminal portion of the third winding. In this configuration, the leg portions can extend the insulation distance between the terminal portion of the first winding and the terminal portion of the third winding.

Advantageous Effects of Invention

According to one aspect of the present invention, it is possible to suppress oscillation in a closed circuit including a noise attenuation unit.

DESCRIPTION OF EMBODIMENTS

Figure 1:
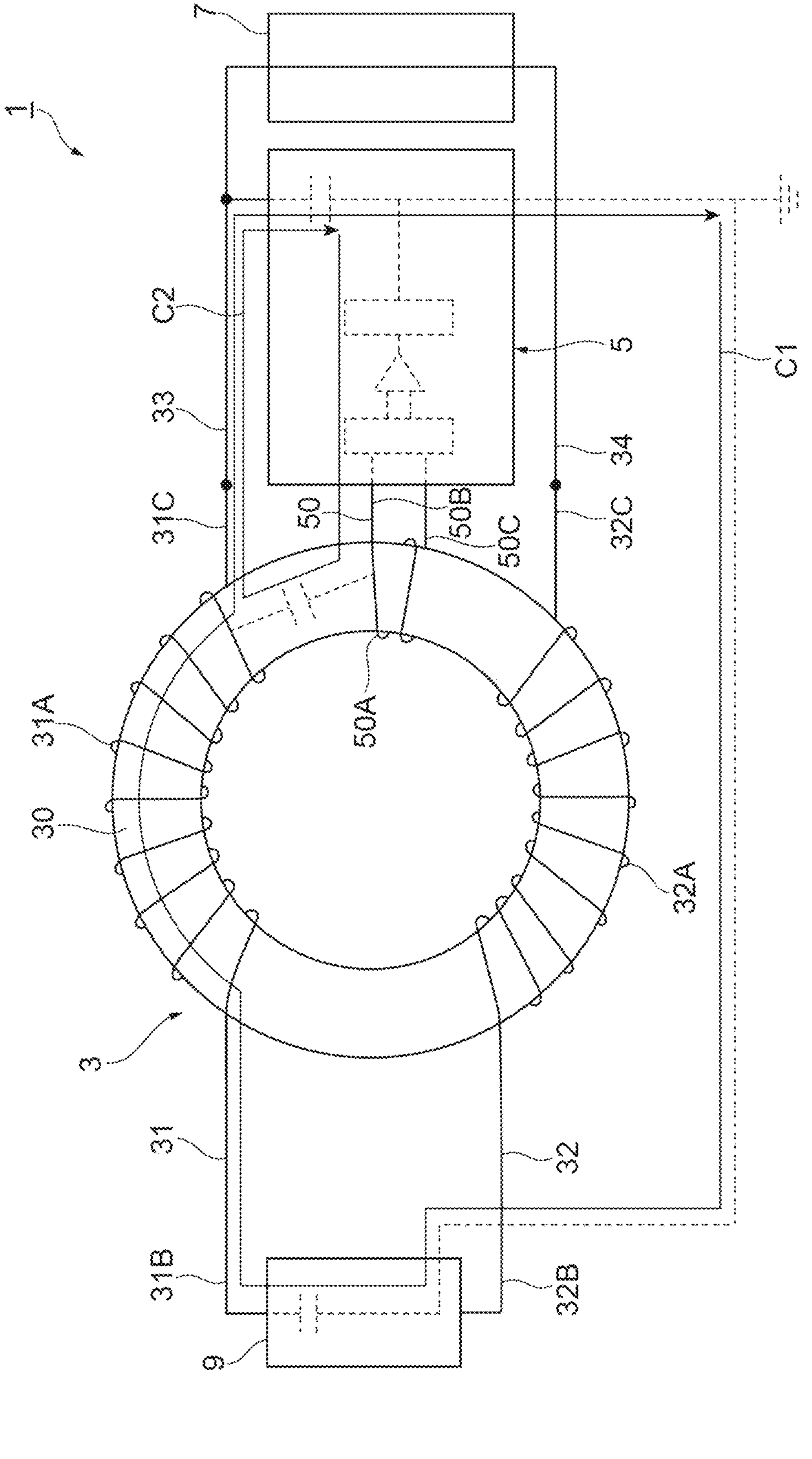
FIG. 1 is a diagram showing a power supply device according to a first embodiment.

Hereinafter, preferred embodiments of the present invention will be described in detail with reference to the accompanying drawings. In the description of the drawings, the same or corresponding elements are designated by the same reference numerals, and duplicated descriptions will be omitted.

First Embodiment

FIG. 1 is a diagram showing a power supply device according to a first embodiment. As shown in FIG. 1, the power supply device 1 includes a main circuit 3, a noise attenuation unit 5, a switching unit 7, and a power source 9. In the power supply device 1, noise generated in the switching unit 7 is attenuated by the noise attenuation unit 5. The power supply device 1 is connected to a load or the like and supplies power to the load or the like.

The main circuit 3 includes a core 30, a first common mode coil 31, a second common mode coil 32, a first connection line 33, and a second connection line 34. The core 30, the first common mode coil 31 and the second common mode coil 32 form a common mode choke coil.

In the common mode choke coil, when a current of a common mode (hereinafter, referred to as a "common mode current") flows through the first common mode coil 31 and the second common mode coil 32, a magnetic flux is generated by an electromagnetic induction phenomenon in the first common mode coil 31 and the second common mode coil 32. In this case, directions of the generated magnetic fluxes are the same, and the magnetic fluxes reinforce each other and function as an inductor. When a differential mode current flows through the first common mode coil 31 and the second common mode coil 32, the directions of the generated magnetic fluxes are opposite to each other, and therefore the magnetic fluxes cancel out each other. Thus, they do not function as an inductor for the differential mode current.

The core 30 is made of a magnetic material. The core 30 has an annular shape in the example shown in FIG. 1.

Figure 2A:
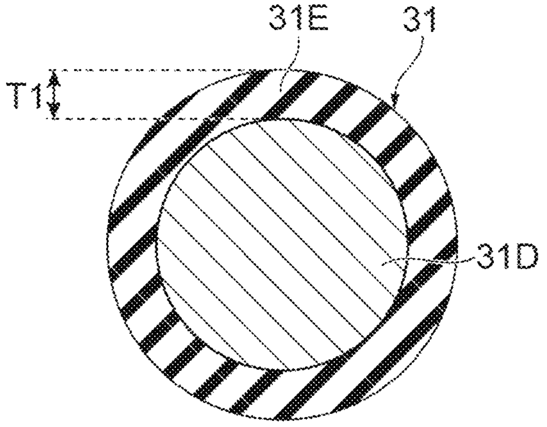
FIG. 2(*a*) is a cross-sectional view of a first common mode coil, FIG. 2(*b*) is a cross-sectional view of a second common mode coil, and FIG. 2(*c*) is a cross-sectional view of an auxiliary coil.
Figure 2B:
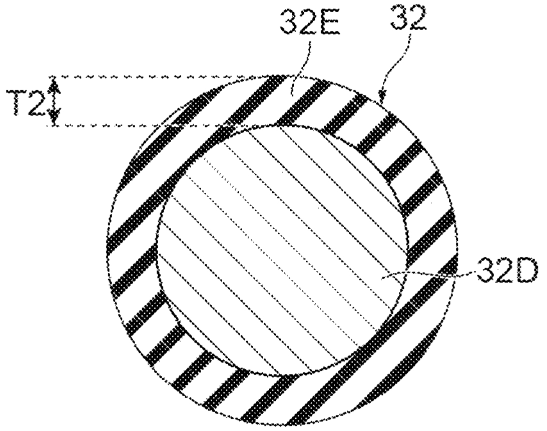
Figure 2C:
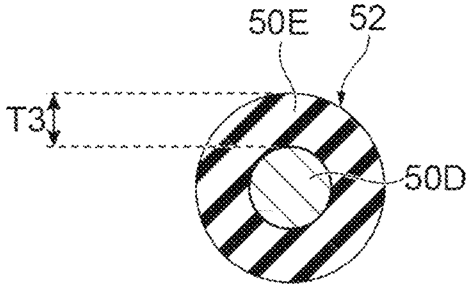

The first common mode coil 31 includes a winding portion 31A that is wound around the core 30, and two terminal portions 31B and 31C that extend from both ends of the winding portion 31A. As shown in FIG. 2(*a*), the first common mode coil 31 includes a first winding 31D and a first coating 31E. The first winding 31D is made of a material having electrical conductivity. The first coating 31E coats the first winding 31D. The first coating 31E is made of a material having electrical insulation properties. One end of the first common mode coil 31 (in other words, one end portion of the two terminal portions 31B and 31C) is connected to the power source 9. The other end of the first common mode coil 31 (in other words, the other end portion of the two terminal portions 31B and 31C) is connected to the first connection line 33.

As shown in FIG. 1, the second common mode coil 32 includes a winding portion 32A that is wound around the core 30, and two terminal portions 32B and 32C that extend from both ends of the winding portion 32A. The second common mode coil 32 is wound around the core 30 in a direction opposite to the first common mode coil 31. As shown in FIG. 2(*b*), the second common mode coil 32 includes a second winding 32D and a second coating 32E. The second winding 32D is made of a material having electrical conductivity. The second coating 32E coats the second winding 32D. The second coating 32E is made of a material having electrical insulation properties. One end of the second common mode coil 32 (in other words, one end portion of the two terminal portions 32B and 32C) is connected to the power source 9. The other end of the second common mode coil 32 (in other words, the other end portion of the two terminal portions 32B and 32C) is connected to the second connection line 34.

As shown in FIG. 1, the first connection line 33 connects the first winding 31D of the first common mode coil 31 and the switching unit 7. The first connection line 33 includes a conductor wire (not shown) and a coating (not shown) that coats the conductor wire. One end of the first connection line 33 is connected to the other end of the first common mode coil 31. The other end of the first connection line 33 is connected to the switching unit 7.

The second connection line 34 connects the second winding 32D of the second common mode coil 32 and the switching unit 7. The second connection wire 34 includes a conductor wire (not shown) and a coating (not shown) that coats the conductor wire. One end of the second connection line 34 is connected to the other end of the second common mode coil 32. The other end of the second connection line 34 is connected to the switching unit 7.

Figure 3:
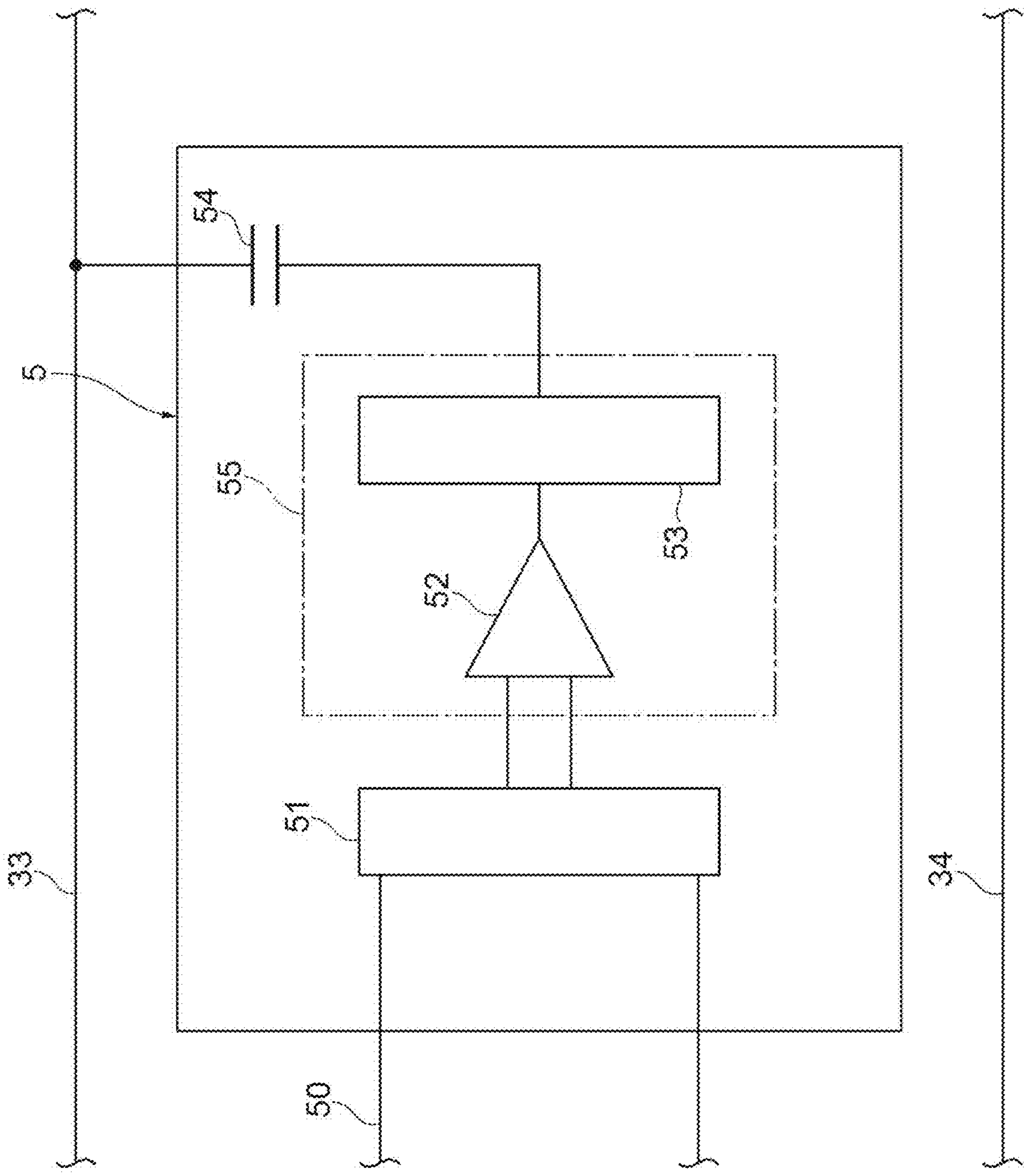
FIG. 3 is a diagram showing a configuration of a noise attenuation unit.

As shown in FIG. 3, the noise attenuation unit 5 includes an auxiliary coil 50, a high-pass filter 51, an amplification unit 52, a low-pass filter 53, and a capacitor 54. The amplification unit 52 and the low-pass filter 53 constitute a resonance suppression unit 55. In this embodiment, the amplification unit 52 and the low-pass filter 53 are integrated together, but for convenience of description, they are illustrated separately in FIG. 3. The noise attenuation unit 5 detects a common mode current in the auxiliary coil 50 and generates a current having a phase opposite to the common mode current, thereby attenuating the noise generated in the switching unit 7.

Here, in the power supply device 1, a first closed circuit C1 including the common mode choke coil and the capacitor 54, and a second closed circuit C2 formed by the first connection line 33, a parasitic capacitance generated between the first winding 31D of the first common mode coil 31 and the third winding 50D of the auxiliary coil 50, the auxiliary coil 50, the high-pass filter 51, the amplification unit 52, the low-pass filter 53, and the capacitor 54 are formed.

In the first closed circuit C1, there is present a first resonant frequency. The first resonant frequency is determined by an inductance of the first winding 31D of the first common mode coil 31 and the capacitor 54. At the first resonant frequency, a phase of a signal is rotated by 180°.

In the second closed circuit C2, there is present a second resonant frequency that is higher than the first resonant frequency. The second resonant frequency is determined by the parasitic capacitance between the first winding 31D of the first common mode coil 31 and the third winding 50D of the auxiliary coil 50, and a parasitic inductance in the second closed circuit C2. At the second resonant frequency, a phase of a signal is rotated by 180°.

The auxiliary coil 50 includes a winding portion 50A that is wound around the core 30, and two terminal portions 50B and 50C that extend from both ends of the winding portion 50A. As shown in FIG. 2(*c*), the auxiliary coil 50 includes a third winding 50D and a third coating 50E. The third winding 50D is made of a material having electrical conductivity. The third coating 50E coats the third winding 50D. The third coating 50E is made of a material having electrical insulation properties. Both ends of the auxiliary coil 50 (in other words, end portions of each of the two terminal portions 50B and 50C) are connected to input terminals of the high-pass filter 51. The auxiliary coil 50 detects a common mode current in the core 30. The auxiliary coil 50 outputs the detected common mode current to the high-pass filter 51.

In this embodiment, a diameter of the third winding 50D of the auxiliary coil 50 is smaller than diameters of the first winding 31D of the first common mode coil 31 and the second winding 32D of the second common mode coil 32. The diameter of the first winding 31D of the first common mode coil 31 is equal to the diameter of the second winding 32D of the second common mode coil 32. A thickness T3 of the third coating 50E of the auxiliary coil 50 is thicker than a thickness T1 of the first coating 31E of the first common mode coil 31 and a thickness T2 of the second coating 32E of the second common mode coil 32 (T3>T1, T2). The thickness T1 of the first coating 31E of the first common mode coil 31 is equal to the thickness T2 of the second coating 32E of the second common mode coil 32 (T1=T2).

Figure 4:
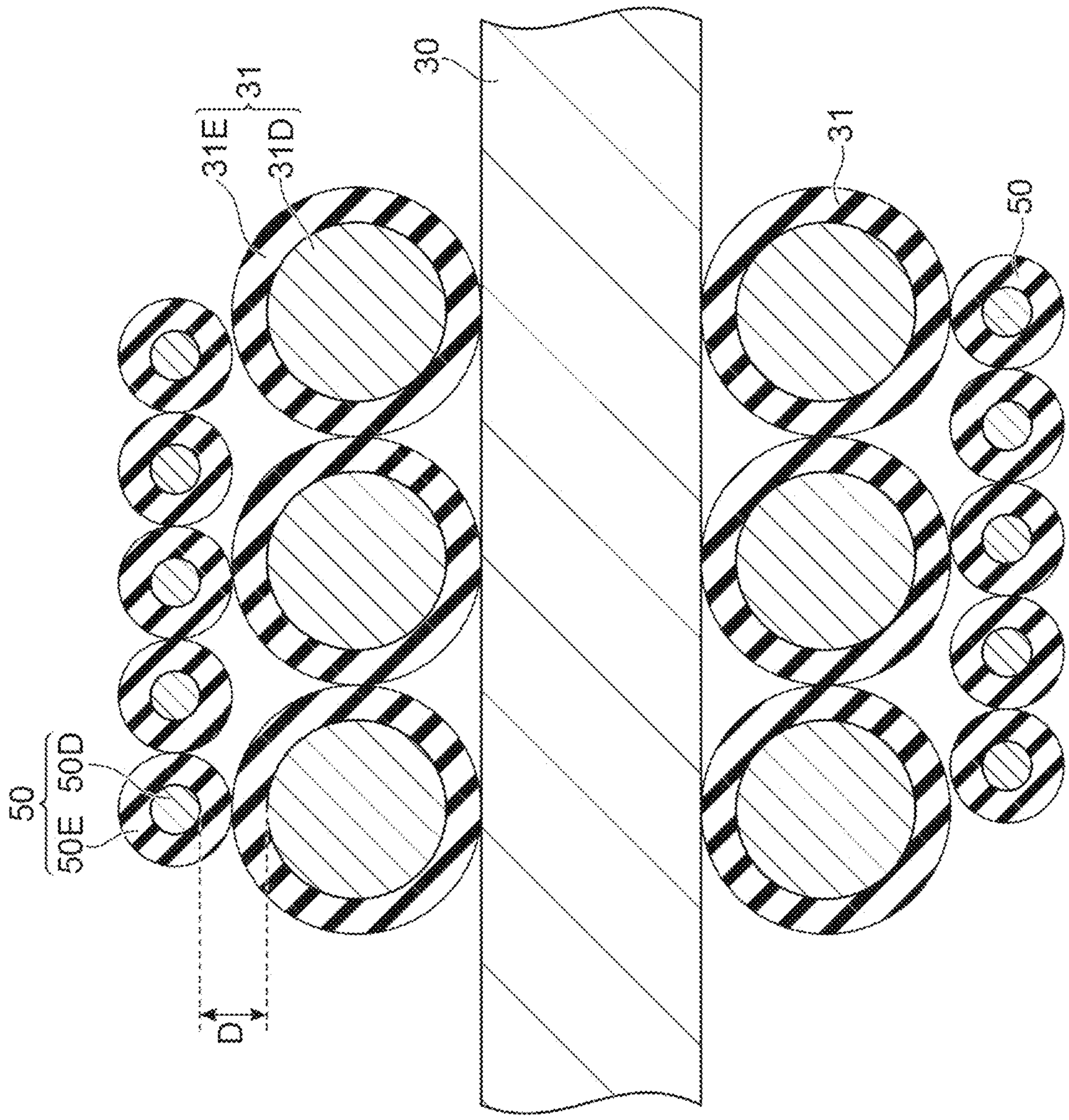
FIG. 4 is a cross-sectional view showing a state in which the first common mode coil and the auxiliary coil are wound around a core.

As shown in FIG. 4, the auxiliary coil 50 of this embodiment is wound around the first common mode coil 31.

Specifically, the first common mode coil 31 is wound around the core 30, and the auxiliary coil 50 is wound around the first common mode coil 31 to overlap the first common mode coil 31 wound around the core 30. In other words, it can be said that the auxiliary coil 50 is wound around the core 30. The auxiliary coil 50 may be wound directly around the core 30 (or may be in contact with the core 30). For ease of description, FIG. 1 shows a state in which the first common mode coil 31 and the auxiliary coil 50 are wound in different positions (regions) relative to the core 30, that is, the auxiliary coil 50 is wound not to be on the first common mode coil 31.

The first winding 31D of the first common mode coil 31 and the third winding 50D of the auxiliary coil 50 are separated by a predetermined insulation distance D. Specifically, the thickness T1 of the first coating 31E of the first common mode coil 31 and the thickness T3 of the third coating 50E of the auxiliary coil 50 are set so that the sum of the thickness T1 of the first coating 31E of the first common mode coil 31 and the thickness T3 of the third coating 50E of the auxiliary coil 50 becomes the predetermined insulation distance D.

The predetermined insulation distance D determines a value of parasitic capacitance generated between the first winding 31D of the first common mode coil 31 and the third winding 50D of the auxiliary coil 50. Therefore, the second resonant frequency determined by the parasitic capacitance generated between the first winding 31D of the first common mode coil 31 and the third winding 50D of the auxiliary coil 50 and the parasitic inductance in the second closed circuit C2 can be adjusted by adjusting the predetermined insulation distance D.

The predetermined insulation distance D is a distance at which a gain of the second closed circuit C2 is 0 or less when an input phase and an output phase at a predetermined point in the second closed circuit C2 (for example, an input terminal of the high-pass filter 51) become in phase.

In this embodiment, since the phase of the signal is rotated by 720° at the second resonant frequency (in other words, the input phase and output phase at a predetermined point in the second closed circuit C2 are in phase), the predetermined insulation distance D is set so that the gain of the second closed circuit C2 at the second resonant frequency is 0 or less.

As shown in FIG. 3, the high-pass filter 51 is a filter circuit that attenuates components below a set frequency (a cutoff frequency) and extracts signals in a frequency band higher than the frequency. The high-pass filter 51 may be configured to include, for example, a capacitor, a resistor, and the like. The auxiliary coil 50 is connected to the input terminal of the high-pass filter 51. The output terminal of the high-pass filter 51 is connected to the input terminal of the amplification unit 52. When a signal including the common mode current output from the auxiliary coil 50 is input, the high-pass filter 51 attenuates components having a frequency equal to or lower than the cutoff frequency. The high-pass filter 51 according to this embodiment is a third-order high-pass filter. In the high-pass filter 51, a phase of an input signal is rotated by 270°. The high-pass filter 51 outputs the processed signal to the amplification unit 52.

The cutoff frequency of the high-pass filter 51 is set, for example, as follows. A main component of the signal detected in the auxiliary coil 50 is a switching frequency of the switching unit 7. The switching frequency of the switching unit 7 is, for example, about 20 to 60 kHz. A frequency of the noise to be attenuated in the noise attenuation unit 5 is, for example, about 150 to 500 kHz. Therefore, the cutoff frequency of the high-pass filter 51 is set to be able to cut off low frequency components including the switching frequency. Furthermore, the cutoff frequency of the high-pass filter 51 is set to a frequency at which the gain of the second closed circuit C2 becomes 0 dB or less when the phase of the signal is rotated by 360°.

The amplification unit 52 amplifies the signal. In this embodiment, the amplification unit 52 is an inverting amplifier circuit. An inverting input terminal of the amplification unit 52 is connected to the output terminal of the high-pass filter 51.

The low-pass filter 53 is a filter circuit that attenuates signals in a frequency band equal to or higher than a set frequency (a cutoff frequency) and extracts signals in a frequency band lower than the frequency. The low-pass filter 53 is configured to include, for example, a capacitor, a resistor, and the like. In this embodiment, the low-pass filter 53 is integrated with the amplification unit 52, and the capacitor and resistor that constitute the low-pass filter 53 are connected between the inverting input terminal and the output terminal of the amplification unit 52.

When the signal output from the amplification unit 52 is input to the low-pass filter 53, the low-pass filter 53 attenuates components having a frequency equal to or higher than the cutoff frequency. In the low-pass filter 53 according to this embodiment, the phase of the input signal is rotated by 90°. The low-pass filter 53 outputs the processed signal to the capacitor 54.

The cutoff frequency of the low-pass filter 53 is set to a frequency at which the gain of the second closed circuit C2 becomes 0 dB or less when the phase of the signal is rotated by 720°.

Here, a magnitude of the gain of the amplification unit 52 is determined according to a degree to which noise is desired to be attenuated. Therefore, in order for a designer to adjust the gain of the second closed circuit C2 when the phase of the input and the phase of the output at a predetermined point of the second closed circuit C2 is in phase, at least one of the cutoff frequency of the low-pass filter 53 and the high-frequency side resonance frequency needs to be adjusted.

The capacitor 54 is provided between the first connection line 33 and the output terminal of the amplification unit 52. That is, the capacitor 54 is connected to the first connection line 33.

As shown in FIG. 1, the switching unit 7 has one or more switching elements (not shown). A switching element is an element that can be switched between electrical opening and closing. Examples of switching elements that can be used include metal oxide semiconductor field effect transistors (MOSFETs), insulated gate bipolar transistors (IGBTs), bipolar transistors, and the like.

One end of the first common mode coil 31 and one end of the second common mode coil 32 are connected to the power source 9.

As described above, in the power supply device 1 according to this embodiment, the noise attenuation unit 5 has the low-pass filter 53. Thus, in the power supply device 1, even when the amplification unit 52 amplifies a signal, it is possible to suppress occurrence of oscillation in the second closed circuit C2. As a result, in the power supply device 1, the noise generated in the switching unit 7 can be attenuated.

In the power supply device 1 according to this embodiment, the thickness T3 of the third coating 50E of the auxiliary coil 50 is greater than the thickness T1 of the first coating 31E of the first common mode coil 31. Since a current flowing through the auxiliary coil 50 is smaller than a current flowing through the first common mode coil 31 and the second common mode coil 32, the thickness T3 of the third coating 50E of the auxiliary coil 50 can be made thicker than those of the first coating 31E of the first common mode coil 31 and the second coating 32E of the second common mode coil 32.

Therefore, in the embodiment, by adjusting the thickness T3 of the third coating 50E of the auxiliary coil 50, the parasitic capacitance generated between the first winding 31D of the first common mode coil 31 and the third winding 50D of the auxiliary coil 50 is adjusted, and the resonant frequency on the high-frequency side is adjusted. For example, when the low-pass filter 53 is made smaller in size, the cutoff frequency becomes higher, and it may become impossible to reduce the gain at the resonance frequency on the high-frequency side. Therefore, the parasitic capacitance can be reduced and the resonance frequency can be increased by increasing the thickness T3 of the third coating 50E of the auxiliary coil 50, and thus even when the low-pass filter 53 is made smaller in size, the occurrence of oscillation in the second closed circuit C2 can be suppressed.

In the power supply device 1 according to this embodiment, the capacitor 54 is connected to the first connection line 33, and the predetermined insulation distance D is a distance at which the gain of the second closed circuit C2 is 0 or less when the input phase and the output phase at a predetermined point of the second closed circuit C2 (for example, the input terminal of the high-pass filter 51) are in phase with each other. Therefore, even when the gain of the second closed circuit C2 becomes higher at the resonant frequency determined by the parasitic capacitance, it is possible to suppress the occurrence of oscillation in the second closed circuit C2.

In the power supply device 1 according to this embodiment, the thickness T3 of the third coating 50E of the auxiliary coil 50 is greater than the thickness T1 of the first coating 31E of the first common mode coil 31 and the thickness T2 of the second coating 32E of the second common mode coil 32. In this configuration, the distance between the first winding 31D and the third winding 50D can be easily set to the predetermined insulation distance D without impairing heat dissipation of the first winding 31D through which a current larger than in the third winding 50D flows, and which generates more heat than the third winding 50D.

Second Embodiment

Next, a second embodiment will be described. It has the same configuration as the first embodiment, except for the configuration of the common mode choke coil.

Figure 5:
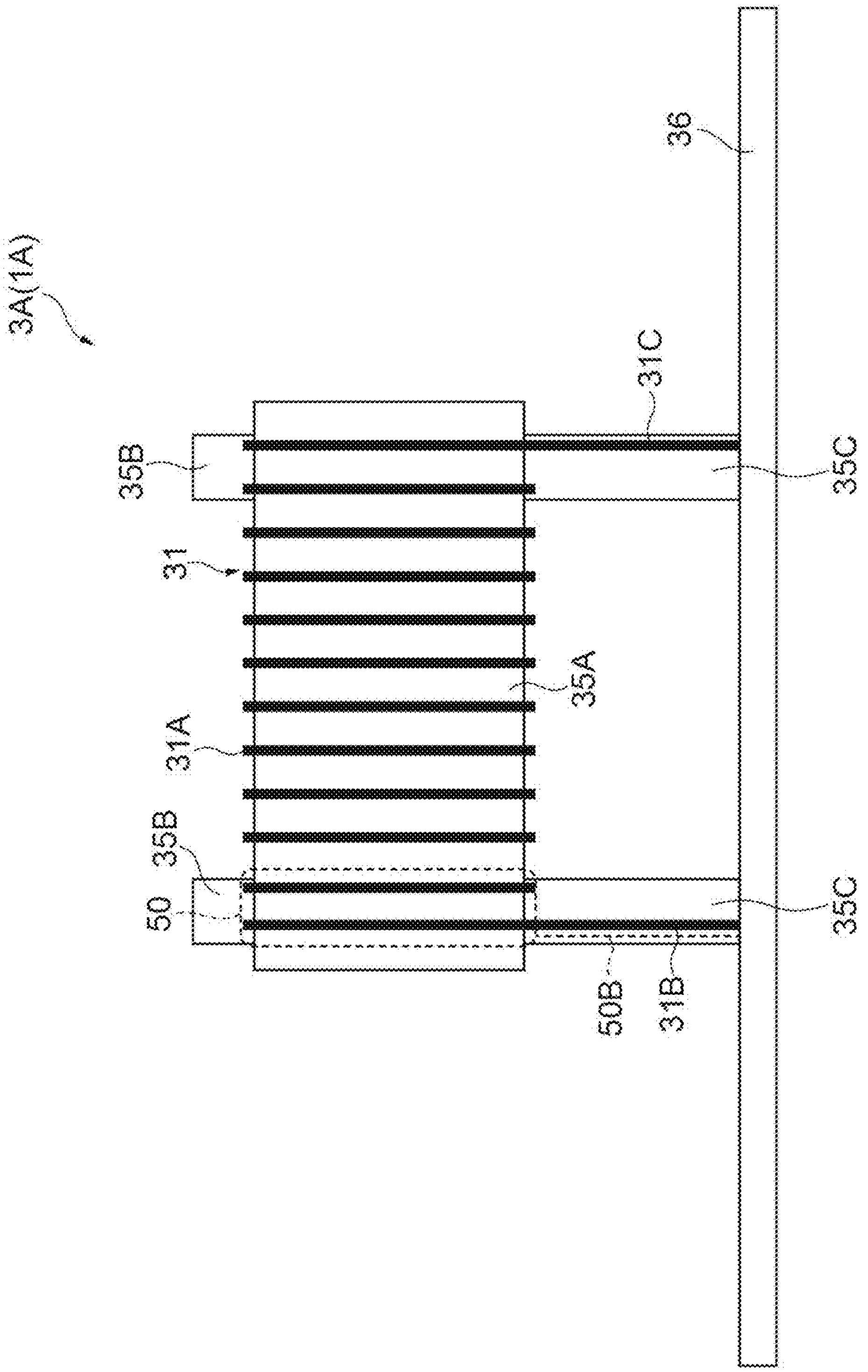
FIG. 5 shows a state in which a first common mode coil and an auxiliary coil are wound around a bobbin in a power supply device according to a second embodiment.

FIG. 5 shows a state in which the first common mode coil 31 and the auxiliary coil 50 are wound around a bobbin in a power supply device according to the second embodiment. As shown in FIG. 5, a common mode choke coil of the power supply device 1A includes a square tubular core (not shown) and a bobbin 35 that accommodates the core. The first common mode coil 31, the second common mode coil 32 and the auxiliary coil 50 are wound around the bobbin 35. The bobbin 35 is disposed on a substrate 36. In FIG. 5, illustration of the second common mode coil 32 is omitted.

The core of this embodiment is configured of four rectangular pillars and four corner portions. The bobbin 35 has a main body portion 35A, a protrusion portion 35B, and leg portions 35C. The main body portion 35A is configured of four tubular portions that cover the rectangular pillars of the core, and four connecting portions that cover the corner portions of the core, and has a rectangular tubular shape in overall view, similar to the core. The main body portion 35A is formed to be slightly larger than the core and accommodates the core. The main body portion 35A is a portion around which the first common mode coil 31, the second common mode coil 32, and the auxiliary coil 50 are wound.

The first common mode coil 31, the second common mode coil 32, and the auxiliary coil 50 include winding portions 31A, 32A, and 50A wound around the main body portion 35A of the bobbin 35, and terminal portions 31B, 31C, 32B, 32C, 50B, and 50C that extend from both ends of the winding portions 31A, 32A, and 50A toward the substrate 36 and have end portions connected to the substrate 36.

The first common mode coil 31, the second common mode coil 32 and the auxiliary coil 50 are wound in different regions of the main body portion 35A of the bobbin 35. That is, the first common mode coil 31, the second common mode coil 32 and the auxiliary coil 50 are wound around the main body portion 35A of the bobbin 35 not to overlap each other.

In this embodiment, among the four tubular portions, the second common mode coil 32 is wound around the tubular portion that is provided opposite to the tubular portion around which the first common mode coil 31 is wound, and the auxiliary coil 50 is wound around one of the tubular portions provided between the tubular portion around which the first common mode coil 31 is wound and the tubular portion around which the second common mode coil 32 is wound. That is, the tubular portion around which the first common mode coil 31 is wound and the tubular portion around which the second common mode coil 32 is wound correspond to a first region in the present invention, and the tubular portion around which the auxiliary coil 50 is wound corresponds to a second region in the present invention.

The protrusion portion 35B is provided to protrude from a portion of the main body portion 35A around which the first common mode coil 31, the second common mode coil 32, and the auxiliary coil 50 are not wound. The protrusion portion 35B in this embodiment is provided at the connecting portion of the main body portion 35A. More specifically, the protrusion portion 35B is provided at a connecting portion located between the tubular portion around which the first common mode coil 31 is wound and the tubular portion around which the auxiliary coil 50 is wound. In other words, it can be said that the protrusion portion 35B is provided between the first region and the second region of the main body portion 35A of the bobbin 35. The protrusion portion 35B is provided to separate the first common mode coil 31 and the auxiliary coil 50 by a predetermined insulation distance D (refer to FIG. 4). The predetermined insulation distance D is the shortest distance between the first common mode coil 31 and the auxiliary coil 50 wound on the inner peripheral side of the main body portion 35A.

The leg portions 35C protrude in a direction opposite to a protruding direction of the protrusion portion 35B from portions of the main body portion 35A around which the first common mode coil 31, the second common mode coil 32, and the auxiliary coil 50 are not wound (in this embodiment, the four connecting portions). Four leg portions 35C are provided. The leg portions 35C extend from the main body portion 35A toward the substrate 36. The leg portions 35C are fixed to the substrate 36. Among the four leg portions 35C, the leg portion 35C protruding from the connecting portion located between the tubular portion around which the first common mode coil 31 is wound and the tubular portion around which the auxiliary coil 50 is wound is provided to separate the terminal portions 31B and 31C of the first common mode coil 31 and the terminal portions 50B and 50C of the auxiliary coil 50 from each other by a predetermined insulation distance D.

As described above, in the power supply device 1A according to this embodiment, the noise attenuation unit 5 has a low-pass filter 53, similar to the power supply device 1. Thus, in the power supply device 1, even when the amplification unit 52 amplifies the signal, it is possible to suppress the occurrence of oscillation in the second closed circuit C2. As a result, in the power supply device 1A, the noise generated in the switching unit 7 can be attenuated.

In the power supply device 1A of this embodiment, the protrusion portion 35B is provided at a connecting portion located between the tubular portion around which the first common mode coil 31 is wound and the tubular portion around which the auxiliary coil 50 is wound. In this configuration, the protruding portion 35B can increase an insulation distance between the first winding 31D and the third winding 50D.

In the power supply device 1A of this embodiment, a main circuit 3A has the substrate 36 to which the terminal portions of the first winding 31D of the first common mode coil 31, the second winding 32D of the second common mode coil 32, and the third winding 50D of the auxiliary coil 50 are connected. The bobbin 35 has a main body portion 35A that accommodates the core and around which the first winding 31D, the second winding 32D and the third winding 50D are wound, and leg portions 35C that extend from the main body portion 35A toward the substrate 36 and are mounted on the substrate 36. The leg portions 35C are provided between the terminal portions 31B and 31C of the first winding 31D and the terminal portions 50B and 50C of the third winding 50D. In this configuration, the leg portion 35C can increase the insulation distance between the terminal portions 31B and 31C of the first winding 31D and the terminal portions 50B and 50C of the third winding 50D.

Although the embodiment of the present invention has been described above, the present invention is not necessarily limited to the above-described embodiment, and various modifications are possible without departing from the gist of the present invention.

In the above first embodiment, the example in which the core has an annular shape has been described, and in the second embodiment, an example in which the core has a rectangular tubular shape has been described. However, the shape of the core is not limited thereto.

In the above embodiment, the example in which the noise attenuation unit 5 includes the high-pass filter 51 has been described. However, the high-pass filter 51 does not necessarily have to be provided.

In the above embodiment, the example in which the amplification unit 52 and the low-pass filter 53 are integrated has been described. However, the amplification unit and the low-pass filter 53 may be configured separately. Also, the high-pass filter 51 and the amplification unit 52 may be integrated.

In the above embodiment, only the noise attenuation unit 5 having the capacitor 54 connected to the first connection line 33 is provided, but the present invention is not limited thereto, and a noise attenuation unit having a capacitor connected to the second connection line 34 may also be provided.

In addition to the above embodiment, the capacitor 54 and the resonance suppression unit 55 may be connected via a resistor or the like.

In the above first embodiment, the example in which the auxiliary coil 50 is wound around the first common mode coil 31 has been described. However, the auxiliary coil 50 may be wound only around the second common mode coil 32, or may be wound around both the first common mode coil 31 and the second common mode coil 32. When the auxiliary coil 50 is wound on the second common mode coil 32, the capacitor may be connected to the second connection line 34.

In the above second embodiment, the example in which the protrusion portion 35B is provided at a connecting portion located between the tubular portion around which the first common mode coil 31 is wound and the tubular portion around which the auxiliary coil 50 is wound has been described. However, the protrusion portion 35B may be provided at a connecting portion located between the tubular portion around which the second common mode coil 32 is wound and the tubular portion around which the auxiliary coil 50 is wound.

In the above embodiment, the example in which, in the noise attenuation unit 5, the input terminal of the amplification unit 52 is electrically connected to the third winding 50D of the auxiliary coil 50, and the output terminal of the amplification unit 52 is electrically connected to the capacitor 54 has been described. However, the input terminal of the amplification unit may be electrically connected to the capacitor, and the output terminal of the amplification unit may be electrically connected to the third winding. In this configuration, a common mode voltage is detected by the capacitor, and a signal including the common mode voltage is amplified in the amplification unit to generate an attenuated current. Then, by outputting the attenuated current to a transformer (a coil) via the third winding, it is possible to attenuate noise generated in the switching unit.

REFERENCE SIGNS LIST

1, 1A Power supply device, 3, 3A Main circuit, 5 Noise attenuation unit, 7 Switching unit, 30 Core, 31 First common mode coil, 31A Winding portion, 31B, 31C Terminal portion, 31D First winding, 31E First coating, 32 Second common mode coil, 32A Winding portion, 32B, 32C Terminal portion, 32D Second winding, 32E Second coating, 33 First connection line, 34 Second connection line, 35 Bobbin, 35A Main body portion, 32B Protrusion portion, 35C Leg portion, 36 Substrate, 50 Auxiliary coil, 50A Winding portion, 50B, 50C Terminal portion, 50D Third winding, 50E Third coating, 52 Amplification unit, 53 Low-pass filter, 55 Resonance suppression unit, D Insulation distance

The invention claimed is:

1. A power supply device comprising:

a main circuit;

a switching unit connected to the main circuit; and a noise attenuation unit configured to attenuate noise generated in the switching unit, wherein the main circuit includes a core, a first common mode coil including a first winding and a first coating configured to coat the first winding and wound around the core, a second common mode coil including a second winding and a second coating configured to coat the second winding and wound around the core, a first connection line configured to connect the first winding and the switching unit, and a second connection line configured to connect the second winding and the switching unit, and the noise attenuation unit includes an auxiliary coil including a third winding and a third coating configured to coat the third winding and wound around the core such that the third winding is spaced apart from the first winding and the second winding by a predetermined insulation distance, a capacitor connected to at least one of the first connection line and the second connection line, and a resonance suppression unit including an amplification unit and a low-pass filter connected to the amplification unit and provided between the auxiliary coil and the capacitor, wherein the capacitor is connected to the first connection line, and the predetermined insulation distance is a distance at which a gain of a closed circuit becomes 0 or less when a phase of an input and a phase of an output at a predetermined point of the closed circuit including a parasitic capacitance generated between the first winding and the third winding, the third winding, the resonance suppression unit, the capacitor, and the first connection line are in phase.

2. The power supply device according to claim 1, wherein an input terminal of the amplification unit is electrically connected to the third winding, and an output terminal of the amplification unit is electrically connected to the capacitor.

3. The power supply device according to claim 1, wherein an input terminal of the amplification unit is electrically connected to the capacitor, and an output terminal of the amplification unit is electrically connected to the third winding.

4. The power supply device according to claim 1, wherein the auxiliary coil is wound on the first common mode coil, and the predetermined insulation distance is a sum of a thickness of the third coating and a thickness of the first coating.

5. The power supply device according to claim 4, wherein the thickness of the third coating is thicker than the thickness of the first coating.

6. A power supply device comprising:

a main circuit;

a switching unit connected to the main circuit; and a noise attenuation unit configured to attenuate noise generated in the switching unit, wherein the main circuit includes a core, a first common mode coil including a first winding and a first coating configured to coat the first winding and wound around the core, a second common mode coil including a second winding and a second coating configured to coat the second winding and wound around the core, a first connection line configured to connect the first winding and the switching unit, and a second connection line configured to connect the second winding and the switching unit, and the noise attenuation unit includes an auxiliary coil including a third winding and a third coating configured to coat the third winding and wound around the core such that the third winding is spaced apart from the first winding and the second winding by a predetermined insulation distance, a capacitor connected to at least one of the first connection line and the second connection line, and a resonance suppression unit including an amplification unit and a low-pass filter connected to the amplification unit and provided between the auxiliary coil and the capacitor, wherein the capacitor is connected to the first connection line, the auxiliary coil is wound around a portion of the core around which the first common mode coil and the second common mode coil are not wound, and the predetermined insulation distance is a distance at which a gain of a closed circuit becomes 0 or less when a phase of an input and a phase of an output at a predetermined point of the closed circuit including a parasitic capacitance generated between the first winding and the third winding, the third winding, the resonance suppression unit, the capacitor, and the first connection line are in phase.

7. The power supply device according to claim 6, wherein the capacitor is connected to the first connection line, the main circuit has a bobbin that accommodates the core, the first common mode coil and the second common mode coil are wound around a first region in the bobbin, the auxiliary coil is wound around a second region in the bobbin that is different from the first region, and the bobbin has a protrusion portion provided between the first region and the second region such that the first winding and the third winding are spaced apart by the predetermined insulation distance.

8. The power supply device according to claim 7, wherein the first winding, the second winding, and the third winding each include a winding portion wound around the bobbin and have terminal portions that extend from both ends of the winding portion, the main circuit has a substrate to which the terminal portion of the first winding, the terminal portion of the second winding, and the terminal portion of the third winding are connected, the bobbin has a main body portion that accommodates the core and around which the winding portion of the first winding, the winding portion of the second winding, and the winding portion of the third winding are wound, and leg portions that extend from the main body portion toward the substrate and are mounted on the substrate, and the leg portions are provided between the terminal portion of the first winding and the terminal portion of the third winding.

* * * * *